United States Patent [19]
Sato et al.

[11] 4,149,171
[45] Apr. 10, 1979

[54] THERMAL RECORDING METHOD

[75] Inventors: Kunio Sato; Yasuyuki Kojima, both of Hitachi, Japan

[73] Assignee: Hitachi, Ltd., Japan

[21] Appl. No.: 871,802

[22] Filed: Jan. 24, 1978

[30] Foreign Application Priority Data

Jan. 27, 1977 [JP] Japan .................................. 52/8074

[51] Int. Cl.² ........................................ G01D 15/10
[52] U.S. Cl. ..................................... 346/1; 346/76 R; 400/120
[58] Field of Search ............... 346/76 R, 1; 219/216; 400/120

[56] References Cited
U.S. PATENT DOCUMENTS

| 3,984,844 | 10/1976 | Tanno | 346/76 R |
| 4,032,925 | 6/1977 | Kos | 346/76 R |
| 4,091,391 | 5/1978 | Kozima | 346/76 R |

Primary Examiner—Joseph W. Hartary
Attorney, Agent, or Firm—Craig & Antonelli

[57] ABSTRACT

A plurality of lead electrodes are connected to a strip-like heating resistor in parallel and at regular intervals so as to define a heating resistor section between the adjacent lead electrodes. The heating resistor section is supplied with a current across the lead electrodes connected on both sides thereof. According to this invention, one recording block is constructed of a plurality of such heating resistor sections, and the heating resistor sections are sequentially energized within each recording block. By performing a plurality of such energizing cycles within each recording block, dots corresponding to the respective heating resistor sections are recorded.

2 Claims, 9 Drawing Figures

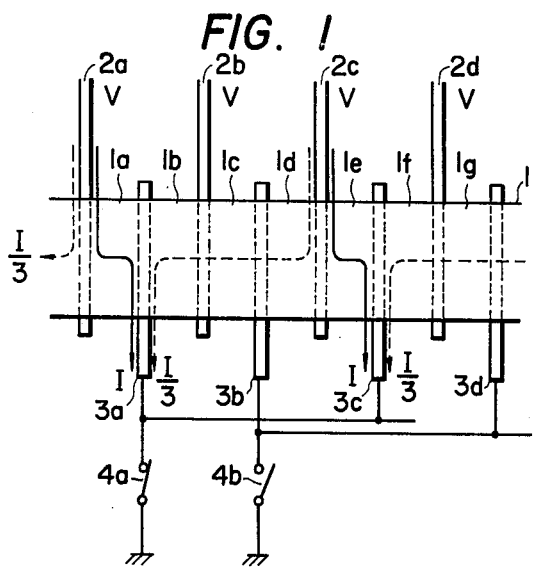

| RECORD-ING CYCLE | STEP | POWER SUPPLY (XP) | | | |
|---|---|---|---|---|---|
| | | Ia | Ib | Ic | Id |
| I | 1 | 1 | 1/9 | 1/9 | 1/9 |
| | 2 | 1/9 | 1 | 1/9 | 1/9 |
| | 3 | 1/9 | 1/9 | 1 | 1/9 |
| | 4 | 1/9 | 1/9 | 1/9 | 1 |
| II | 5 | 1 | 1/9 | 1/9 | 1/9 |
| | 6 | 1/9 | 1 | 1/9 | 1/9 |
| | 7 | 1/9 | 1/9 | 1 | 1/9 |
| | 8 | 1/9 | 1/9 | 1/9 | 1 |
| III | 9 | 1 | 1/9 | 1/9 | 1/9 |
| | 10 | 1/9 | 1 | 1/9 | 1/9 |
| | 11 | 1/9 | 1/9 | 1 | 1/9 |
| | 12 | 1/9 | 1/9 | 1/9 | 1 |
| IV | 13 | 1 | 1/9 | 1/9 | 1/9 |
| | 14 | 1/9 | 1 | 1/9 | 1/9 |
| | 15 | 1/9 | 1/9 | 1 | 1/9 |
| | 16 | 1/9 | 1/9 | 1/9 | 1 |

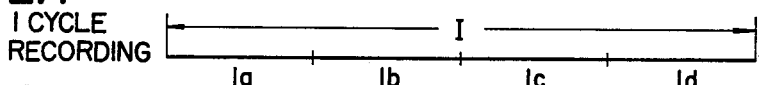

FIG. 2A — 1 CYCLE RECORDING

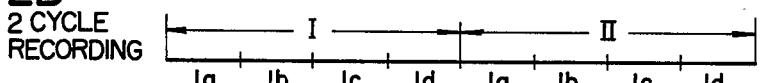

FIG. 2B — 2 CYCLE RECORDING

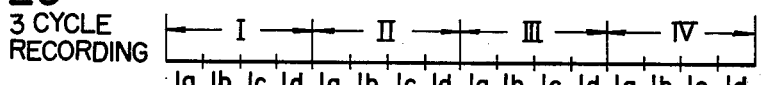

FIG. 2C — 3 CYCLE RECORDING

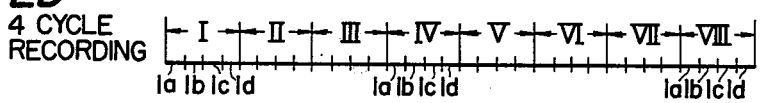

FIG. 2D — 4 CYCLE RECORDING

FIG. 4

| RECORDING CYCLE | NUMBER OF LEAKAGE POWER SUPPLY | | | |
|---|---|---|---|---|
| | Ia | Ib | Ic | Id |
| I | 0 | 1 | 2 | 3 |
| II | 3 | 4 | 5 | 6 |
| IV | 9 | 10 | 11 | 12 |
| VIII | 21 | 22 | 23 | 24 |
| n | 3n-3 | 3n-2 | 3n-1 | 3n |

FIG. 5

| RECORDING CYCLE | RATE OF LEAKAGE POWER (MAX.=1) | | | |
|---|---|---|---|---|
| | Ia | Ib | Ic | Id |
| I | 0 | 0.33 | 0.67 | 1 |
| II | 0.50 | 0.67 | 0.83 | 1 |
| IV | 0.75 | 0.83 | 0.92 | 1 |
| VIII | 0.88 | 0.92 | 0.93 | 1 |
| n | $1-\frac{1}{n}$ | $\frac{3n-2}{3n}$ | $\frac{3n-1}{3n}$ | 1 |

THERMAL RECORDING METHOD

BACKGROUND OF THE INVENTION

1. Field of the Invention

This invention relates to a thermal recording method. More particularly, it relates to a thermal recording method employing a thermal recording head in which the opposing sides of the adjacent ones of a large number of heating resistor sections arrayed into a row are connected to a common lead electrode.

2. Description of the Prior Art

There has been known a thermal recording method wherein a current is caused to flow through a heating resistor section and heat thus generated in the heating resistor section is applied to a thermally responsive recording paper thereby to record information. An apparatus for such recording is disclosed in U.S. Pat. No. 3,984,844 (inventors: Kiyohiko Tanno, Yasuyuki Kojima; filed: Nov. 18, 1975; Appl. No. 633,115; patent: October 5, 1976). With the recording method described in the patent specification, a leakage current flows to a heating resistor section adjacent to a resistor section which ought to heat. Accordingly, the heating resistor section which is energized for recording after the flow of the leakage current undergoes a quantity of heat larger than that of the heating resistor section which has been energized previously. Therefore, nonuniform recording is incurred.

SUMMARY OF THE INVENTION

Object

An object of this invention is to provide a thermal recording method which reduces nonuniformity in the recording density.

Summary

In a thermal recording method wherein one recording block is made up of a plurality of heating resistor sections and wherein the heating resistor sections within the recording block are successively supplied with recording power through lead electrodes, this invention consists in executing a plurality of such energizing cycles for the heating resistor sections, thereby to heat the respective heating resistor sections up to a required temperature and to record dots on a thermally responsive recording paper.

BRIEF DESCRIPTION OF THE DRAWINGS

FIG. 1 is a principle diagram of a recording head as well as a control circuit therefor, FIGS. 2A and 2D are diagrams for explaining recording cycles, FIG. 3 is a table which indicates quantities of power injection into respective heating resistor sections, FIG. 4 is a table which indicates numbers of power leakage to the respective heating resistor sections, FIG. 5 is a table which indicates rates of leakage power in the respective heating resistor sections.

DETAILED DESCRIPTION OF THE PREFERRED EMBODIMENTS

Figure 6:
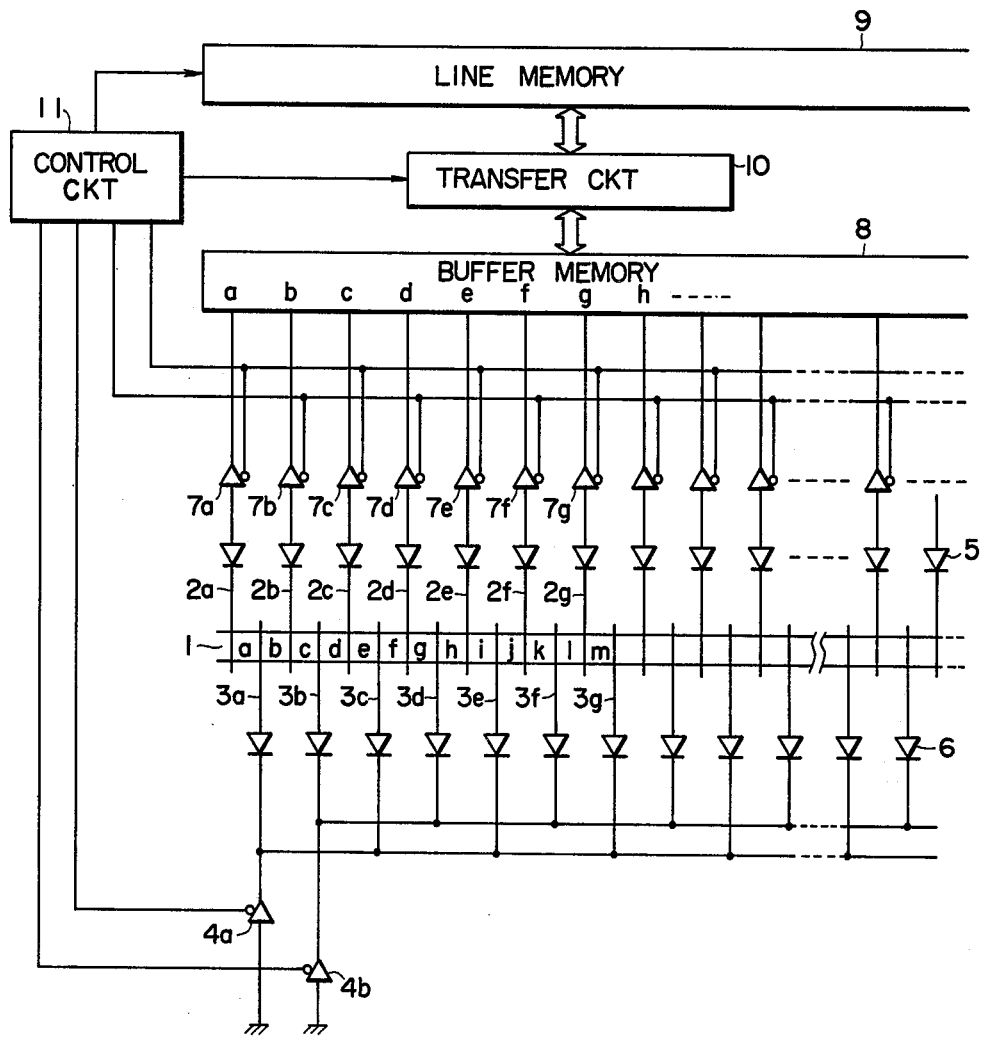
FIG. 6 is an electric diagram of a thermal recording apparatus according to this invention.

FIG. 1 shows a part of a recording circuit of a thermal recording head which carries out recording of 1 cycle by 4 steps within 1 block. A strip-like heating resistor 1 is divided into sections $1a$, $1b$, $1c$, ... by lead electrodes $2a$, $2b$, $2c$, ... and $3a$, $3b$, $3c$, ....

At the first step in the case of recording full black, a recording voltage V is applied to the lead electrodes $2a$ and $2c$ and the lead electrodes $3a$ and $3c$ are earthed by a switch $4a$ as illustrated in FIG. 1. Then, the heating resistor sections $1a$ and $1e$ are heated by a recording current I (recording power P = V.I) and color a recording paper lying in contact with these resistor sections. In this case, also the heating resistor sections $1b$, $1c$, $1d$, $1f$ and $1g$ undergo heating by a leakage current I/3 (leakage power P' = P/9). The recording paper, however, is not colored by the injected power of P/9 owing to the coloration characteritistic thereof.

The recording voltage V and the earth switches $4a$ and $4b$ are selected so as to inject the recording power P into the heating resistor sections $1b$ and $1f$ at the second step, into the heating resistor sections $1c$ and $1g$ at the third step and into the heating resistor section $1d$ at the fourth step. Then, as in the first step, the leakage power P/9 is injected into the other heating resistor sections into which the recording power P is not injected.

These are put in order as to one block in FIG. 2A. One block is made up of the recording positions $1a$–$1d$, which correspond to the symbols of the heating resistor sections respectively.

Supposing that power is injected into the recording positions $1a$ and $1d$ in succession in I cycle, the situation is as indicated in FIG. 3 (I cycle of steps 1–4) in the case of the full black recording. More specifically, at the recording position $1a$, the leakage power P/9 is not injected before the recording power P is injected (hereinbelow, the preceding injection of the leakage power shall be termed "leakage power supply"). At the recording position $1b$, the leakage power P/9 is injected while the recording power P is injected into the recording position $1a$ at the step 1, so that the number of leakage power supply is 1. Likewise, the number of leakage power supply is 2 at the recording position $1c$, and it is the greatest and 3 at the recording position $1d$. The numbers of leakage power supply are put in order in FIG. 4.

The outline of this invention will now be described with reference to FIG. 2B (the full black recording). FIG. 2B illustrates a case where the number of recording cycles is II. As regards the period of time during which the recording power is injected, letting $\tau$ denote the time in the case of one recording cycle, the time becomes $(\tau/2) \times 2$ in the case of two recording cycles. Therefore, the whole recording time does not change.

In the case where II recording cycles are performed, the recording sequence becomes $1a \rightarrow 1b \rightarrow 1c \rightarrow 1d \rightarrow 1a \rightarrow 1b \rightarrow 1c \rightarrow 1d$ as illustrated in FIG. 2B. The recording power P and the leakage power P/9 are injected as indicated in FIG. 3 (steps 1–8). Accordingly, whereas the number of leakage power supply is zero at the recording position $1a$ with the prior-art method (recording cycle: I), it becomes 3 (FIG. 4). Here, let the maximum value of the numbers of leakage power supply be 1. Then, as seen from FIG. 5, the difference of the effects of the leakage power supply becomes less than in the prior-art method. Therefore, the density nonuniformity ascribable to the effect of the leakage power supply diminishes.

In case where the number of recording cycles is n, the rate of leakage power at the recording position $1a$ at which the number of leakage power supply is the minimum becomes $(1 - 1/n)$ when the maximum numbers of leakage power supply is denoted by 1. Accordingly, in order to lessen the difference of the effects of the leakage power supply among the recording positions, the number of recording cycles n may be increased. However, when n is too large, the thermal efficiency is degraded.

When $n = 4$ or so, the thermal efficiency is not problematic, and the difference of the effects of the leakage power supply can be confined to about 25%. Therefore, the density nonuniformity poses almost no problem.

A concrete electric circuit of this invention will now be described with reference to FIG. 6.

In FIG. 6, numeral 1 designates a heating resistor, which is divided into sections 1a, 1b, 1c, . . . by lead electrodes 2a, 2b, 2c, . . . and 3a, 3b, 3c, . . . . 4a and 4b indicate group selector switches which are alternately closed. The switch 4a earths the lead electrodes 3a, 3c, 3e, . . . (odd-numbered group), while the switch 4b earths the lead electrodes 3b, 3d, 3f, . . . (even-numbered group). Numberals 5 and 6 represent groups of reverse current-blocking diodes. Information signal-impressing switches 7a, 7b, 7c, . . control the bestowal of outputs of a buffer memory 8 on the lead electrodes 2a, 2b, 2c, . . . . Shown at 9 is a line memory, which stores information for one scanning line. By the function of a transfer circuit 10, the line memory 9 bestows the information on the buffer memory 8 so that the information corresponding to the heating resistor sections 1a, 1b, 1c, . . . may appear at output terminals 8a, 8b, 8c, . . . of the buffer memory 8. Numeral 11 designates a synchronism control circuit, which controls the group selector switches 4a and 4b, the information signal-impressing switches 7a, 7b, 7c, . . . , the line memory 9 and the transfer circuit 10.

The operation of the above construction will be explained as to a case where n cycles each consisting of four steps are performed.

(1) Among the information for one scanning line stored in the line memory 9, the information corresponding to the heating resistor sections 1a, 1b, 1e, 1f, 1i, 1j . . . (odd-numbered group of lead electrodes 3a, 3c, 3e, . . .) are transferred to the buffer memory 8 by the transfer circuit 10 so as to be provided at the output terminals 8a, 8b, 8c, . . . thereof.

(2) The group selector switch 4a is closed.

(3) The information signal-impressing switches 7a, 7c, 7e, . . . are closed for a time of $\tau/n$ ($= \tau_0$), to cause currents to flow to the heating resistor sections 1a, 1e, 1i, . . . (first step in the first cycle).

(4) Subsequently, the information signal-impressing switches 7b, 7d, 7f, . . . are closed for the time of $\tau_0$, to cause currents to flow to the heating resistor sections 1b, 1f, 1j, . . . (second step in the first cycle).

(5) The buffer memory 8 is cleared, and the contents of the line memory 9 are transferred so that the information corresponding to the heating resistor sections 1c, 1d, 1g, 1h, 1k, 1l, . . . (even-numbered group of lead electrodes 3b, 3d, 3f, . . . )may appear at the output terminals 8b, 8c, 8d, . . . of the buffer memory 8.

(6) The group selector switch 4b is closed.

(7) The information signal-impressing switches 7b, 7d, 7f, . . . are closed for the time of $\tau_0$, to cause currents to flow to the heating resistor sections 1c, 1g, 1k, . . . (third step in the first cycle).

(8) The information signal-impressing switches 7c, 7e, 7g, . . . are closed for the time of $\tau_0$, to cause currents to flow to the heating resistor sections 1d, 1h, 1l, . . . (fourth step in the first cycle).

The above series of operations are repeated n cycles, to cause the current to flow to each heating resistor section for a time of $\tau_0 \times n = \tau$ as the whole. Thus, a recording paper is heated up to the coloring temperature thereof.

After completion of the operations of the n cycles, the synchronism control circuit 11 refreshes the contents of the line memory 9 into information for the next scanning line and again makes similar recursive current controls of n cycles each consisting of four steps.

In the foregoing embodiment, the case where one scanning line forms one block has been referred to. However, even in case where it is divided into a plurality of blocks, the 4-step n-cycle recording can be performed by executing current controls similar to the above every block.

As set forth above, according to this invention, a plurality of recording cycles are executed within one block, so that the difference of the effects of the leakage power supply dependent upon the recording positions can be lessened and that a thermosensitive recording free from the density nonuniformity can be attained.

We claim:

1. In a thermal recording method wherein, using a thermal recording head in which respectively adjacent heating resistor sections are connected to a control circuit by common lead electrodes, voltages are sequentially applied between the lead electrodes connected to the sequentially selected heating resistor sections so as to cause currents to flow to these heating resistor sections, thereby causing them to develop heat and coloring a thermally responsive recording paper lying in contact with said thermal recording head, a thermal recording method characterized in that the sequential selection is executed a plurality of cycles and that the period of time of the voltage application, $\tau_0$ is made $\tau_0 \approx \tau/n$ where $\tau$ denotes the period of time required for the coloration and n denotes the number of cycles in the sequential selection.

2. In a thermal recording method wherein, using a thermal recording head in which respectively adjacent heating resistor sections are connected to a control circuit by common lead electrodes, voltages are sequentially applied between the lead electrodes connected to the sequentially selected heating resistor sections so as to cause currents to flow to these heating resistor sections, thereby causing them to develop heat and coloring a thermally responsive recording paper lying in contact with said thermal recording head, a thermal recording method characterized by employing:

a line memory capable of storing information for one scanning line, a buffer memory capable of storing information corresponding to the selected heating resistor sections, a transfer circuit which transfers the information corresponding to the selected heating resistor sections, from said line memory to said buffer memory, information signal-impressing switches which bestow outputs of said buffer memory on the lead electrodes on one side in said thermal recording head, selector switches which selectively activate the lead electrodes on the other side in said thermal recording head, and a synchronism control circuit which controls said line memory, said buffer memory, said transfer circuit, said information signal-impressing switches and said selector switches, and by comprising:

the first step of storing information signals for one scanning line to be recorded, into said line memory, the second step of transferring the selected information of said line memory to said buffer memory by said transfer circuit and thereafter causing currents to flow to the corresponding heating resistor sections by the information signal-impressing switches and the selector switch, and the third step of subsequently transferring the other selected information from said line memory to said buffer memory by said transfer circuit and thereafter causing currents to flow to the other corresponding heating resistor sections by the information signal-impressing switches and the selector switch, said second and third step being repeated, thereby causing the respective heating resistor sections to develop heat up to a required temperature and coloring a thermally responsive recording paper.

* * * * *